United States Patent [19]
Brady et al.

[11] Patent Number: 5,684,898
[45] Date of Patent: Nov. 4, 1997

[54] METHOD AND APPARATUS FOR BACKGROUND DETERMINATION AND SUBTRACTION FOR A MONOCULAR VISION SYSTEM

[75] Inventors: Mark J. Brady, Cottage Grove; Darin G. Cerny, Minneapolis, both of Minn.

[73] Assignee: Minnesota Mining and Manufacturing Company, St. Paul, Minn.

[21] Appl. No.: 458,577

[22] Filed: Jun. 1, 1995

Related U.S. Application Data

[62] Division of Ser. No. 163,422, Dec. 8, 1993, abandoned.
[51] Int. Cl.$^6$ ................................................. G06K 9/38
[52] U.S. Cl. ........................................ 382/282; 382/104
[58] Field of Search ................................ 382/107, 104, 382/215, 216, 103, 100, 276, 282, 286, 291; 358/464; 348/148, 149, 152, 155, 143

[56] References Cited

U.S. PATENT DOCUMENTS

| | | | |
|---|---|---|---|
| 4,577,235 | 3/1986 | Kannapell et al. | 358/280 |
| 4,841,374 | 6/1989 | Kotani et al. | 358/280 |
| 4,903,316 | 2/1990 | Hongo et al. | 382/52 |
| 5,025,480 | 6/1991 | Morton et al. | 382/50 |
| 5,031,227 | 7/1991 | Raasch et al. | 382/22 |
| 5,206,916 | 4/1993 | Castelaz | 382/14 |
| 5,243,418 | 9/1993 | Kuno et al. | 382/107 |
| 5,329,368 | 7/1994 | Plotke | 382/107 |
| 5,557,684 | 9/1996 | Wang et al. | 382/107 |

FOREIGN PATENT DOCUMENTS

| | | | |
|---|---|---|---|
| 36 06 009 | 8/1987 | Germany | G06F 15/66 |
| 37 12 865 | 11/1988 | Germany | G01S 3/78 |
| 57-194376 | 11/1982 | Japan | G01V 9/04 |
| 2 105 941 | 3/1983 | United Kingdom | G01S 17/66 |

OTHER PUBLICATIONS

Ali et al.; "Alternative Practical Methods for Moving Object Detection"; International Conference on Image Processing and Its Applications (Conf. Publ. No. 354), pp. 77–80; 1992.
Lewis et al.; Elements of the Theory of Computation; Prentice–Hall, Inc., Chapter 2–Finite Automata; pp. 49–94; 1981.

*Primary Examiner*—Yon J. Couso
*Attorney, Agent, or Firm*—Gary L. Griswold; Walter N. Kirn, Jr.; Kari H. Bartingale

[57] ABSTRACT

A method and apparatus for producing a background image from a plurality of images of a scene and for subtracting a background image from an input image are described. A background image is produced by dividing an image into subimages, acquiring reference subimages for each subimage location and comparing subsequent subimages with the reference subimage to determine if any objects have passed between the reference subimage and the video camera that acquired images. When objects have passed between the reference subimage and the video camera, the reference subimage is designated as background and stored in a background image. Background portions of an input image can be removed or their intensity diminished with a background image. Foreground weights can be determined by comparing the difference between a background image and an input image. To the extent that corresponding pixels are the same, the pixel is given a low foreground weight, indicating that the pixel is a background weight. The background subtraction method can further employ a weighting curve to take into account noise considerations. The foreground weights are then applied to an input image to diminish or remove pixels in the background.

10 Claims, 6 Drawing Sheets

METHOD AND APPARATUS FOR BACKGROUND DETERMINATION AND SUBTRACTION FOR A MONOCULAR VISION SYSTEM

This is a division of application No. 08/163,422 filed Dec. 8, 1993 now abandoned.

FIELD OF THE INVENTION

This invention relates generally to machine vision systems for tracking objects within a three-dimensional space. In particular, the invention relates to a method and apparatus for determining a background image from a three-dimensional image and for using the background image to extract only foreground images from the three-dimensional image.

BACKGROUND OF THE INVENTION

With the volume of vehicles using roadways today, traffic detection and management have become more important. Current intersection control and traffic data collection devices, namely, inductive loops, ultrasonic and radar systems possess limitations in their area coverage for individual devices. Machine vision systems have begun to assist in traffic management. Machine vision systems typically include video cameras overlooking traffic scenes. The video cameras output video images and the machine vision system processes the images to detect, classify and track vehicles passing through the traffic scene. The information derived from the detection, classification and tracking is then used by the machine vision system for intersection control, incident detection, traffic data collection and other traffic management functions.

Machine vision systems analyze a traffic scene by frame-by-frame analysis of video images acquired by video cameras at traffic scenes. The video images are digitized so that the machine vision system analyzes a pixel representation of the scene. A typical video image array for a video frame will contain a 512×512 pixel image of the scene. Each pixel will have an integer number defining intensity and may have a definition range for three colors of 0–255. To analyze a pixel representation of a traffic scene, a machine vision system must be able to extract pixels of interest from the image as a whole. For example, a machine vision system may only analyze regions within an image where movement has occurred, thereby designating those regions as regions of interest. The machine vision system chooses to only analyze the designated regions of interest because the system only deems those regions where objects are moving as interesting. Thus, a machine vision system analyzing a roadway scene would analyze regions where vehicles were moving, thereby allowing the system to classify and track vehicles, detect incidents such as collisions and extract useful traffic data such as occupancy of the roadway and velocity of vehicles. Further, by designating regions within the entire image as regions of interest, it simplifies the analysis and saves on computational power because the machine vision system does not analyze portions of the scene where no interesting activity is occurring, such as the background.

Even after regions of interest have been designated, only portions within the region of interest are relevant. For example, if a region of interest contains a single automobile driving down the roadway, the area between the automobile and the boundaries of the region of interest will contain background image, such as the road itself. It is preferable to eliminate such background image through data compression, until the region of interest contains as little background image as possible. Data compression is further desirable because once the background is determined, those background pixels no longer need to be processed or transmitted. They can be stored as background image and only those pixels of interest in the foreground image need to be transmitted. Further, security applications can utilize data compression technology by prioritizing images from numerous cameras by taking into account which images have foreground activity in them.

Segmentation is a well known problem in machine vision applications. Segmentation requires defining two or more classes of pixels to which pixels can belong. After defining pixel classes, the machine vision system must analyze an image and decide to which class each pixel belongs. An example of segmentation is defining object/not object classes. Examples of prior methods of segmentation for these classes is region growing and blob definition. The type of segmentation addressed in the present invention is foreground/background segmentation.

Determining background images of a scene is known in the prior art. Three typical methods of background determination are: Simple motion measure, binocular, and non-passive range finding. The simple motion measure method of determining background, as described above, is based on the premise that the foreground regions will be in motion. This premise is not always true. Often, the most interesting objects within a scene are not moving. For example, after a collision of two vehicles, both vehicles are no longer in motion. While the collision is an interesting portion of the roadway scene, once motion no longer exists in the vehicles, they would be deemed to be background.

Binocular methods of background determination require two cameras that must be maintained in precise alignment. The two cameras each acquire video images. The system then translates the video image from one camera on to the video image from the other camera. Then, the system analyzes discrepancies from mapping corresponding pixels between the two images acquired by the two cameras and designated such discrepancies as foreground pixels. While a binocular approach may be appropriate in some cases, the requirement of two cameras instead of only one, the necessity of precise alignment, the extra expense of two cameras as well as the computational overhead required is often undesirable.

Non-passive range finding techniques send out structured light toward the roadway scene. A sensor receives the reflected light beams and determines that areas that rise above the flat surface are objects. In this way, the system builds a three-dimensional map of the image. Active range finding techniques tend to suffer from specular effects. Thus, beams may not return to the sensor, thereby causing the system to fail to receive the sensing information. The present invention does not suffer from the limitations of the aforementioned three background determination methods.

Finite automata are restricted computational models of actual computers. While finite automata have central processing units of fixed finite capacity, they have no auxiliary memory. Thus, they only have a fixed capacity to handle information. Finite automata receive input as a string. For example, an input string may be fed into finite automaton 2 by input tape 4, which is divided into squares, with one input symbol inscribed into each tape square, as shown in FIG. 1. Finite automaton 2 has a finite number of distinct internal states, $q_0$–$q_5$, as recorded by finite control 6. Finite automaton 2 initially sets finite control 6 at a designated initial state.

Then, at regular interval, finite automaton 2 reads one symbol from input tape 4 with reading head 8 and enters a new state that depends only on the current state and the symbol as read by reading head 8. After reading an input symbol, reading head 8 moves to the next input symbol on input tape 4, and continues this process, finite control 6 changing dependent on only the current state and the symbol read. Finite automaton 2 chooses its next state according to rules encoded in a transition function. Thus, if finite automaton reads an input symbol which satisfies the transition function for a particular state, finite control 6 chooses the uniquely determined next state.

The transition function of finite automata may be represented by state diagrams. Referring to FIG. 2, state diagram 10 is a directed graph, with additional information incorporated into the diagram. States are represented by nodes, in state diagram 10, four nodes 12 labeled $q_0$–$q_3$. Input symbols a and b along with the current state will determine the next state of state diagram 10. For example, when the current state of finite automaton is $q_0$, if the input symbol is a, the finite control will choose $q_0$ as the next state. If the input symbol is b, however, the finite control will choose $q_1$ as the next state. The number of states and the number of possible input symbols may vary as required for a particular function.

SUMMARY OF THE INVENTION

To overcome the limitations in the prior art described above, and to overcome other limitations that will become apparent upon reading and understanding the present specification, the present invention provides a method and apparatus for producing a background image from a plurality of images of a scene and for subtracting a background image from an input image. In machine vision systems, digitized images of a scene are acquired with image acquisition means, such as video cameras. In the present invention, to produce a background image from such digitized images, each image is first divided into subimages. A reference subimage is acquired for each subimage location. Subsequent subimages are compared with the reference subimage to determine if any objects have passed between the reference subimage and the video camera. If objects have passed between the reference subimage and the video camera, the reference subimage is designated as a background subimage. The background subimage is then stored in a corresponding position in a background image in memory.

The method of producing a background image can be performed in a finite automaton-like apparatus. A processor can maintain a state table for an image, the state table having one state for each subimage location. A memory is also required for storing reference subimages and time variables for each subimage location. In a preferred embodiment of the present invention, the state table has four states, and initial state, a got reference state, a seen as same reference state and a seen different from reference state. The transition function of the state table implements the method of determining whether any objects have passed between the reference subimage and the video camera.

After a background image has been determined, it may be used to subtract background from image data. Foreground weights can be computed to represent the likelihood that pixels are in the foreground. A weighting curve can be employed to take into account noise considerations. This can be implemented using a lookup table, which takes the image data and the background image as inputs. The lookup table finds the corresponding foreground weight in the table for each pair of corresponding pixels in the two images. The output of the lookup table takes into account the weighting curve. The foreground weights are then applied to the image data to diminish or remove pixels in the background.

BRIEF DESCRIPTION OF THE DRAWINGS

The present invention will be more fully described with reference to the accompanying drawings wherein like reference numerals identify corresponding components, and.

DETAILED DESCRIPTION OF A PREFERRED EMBODIMENT

In the following detailed description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
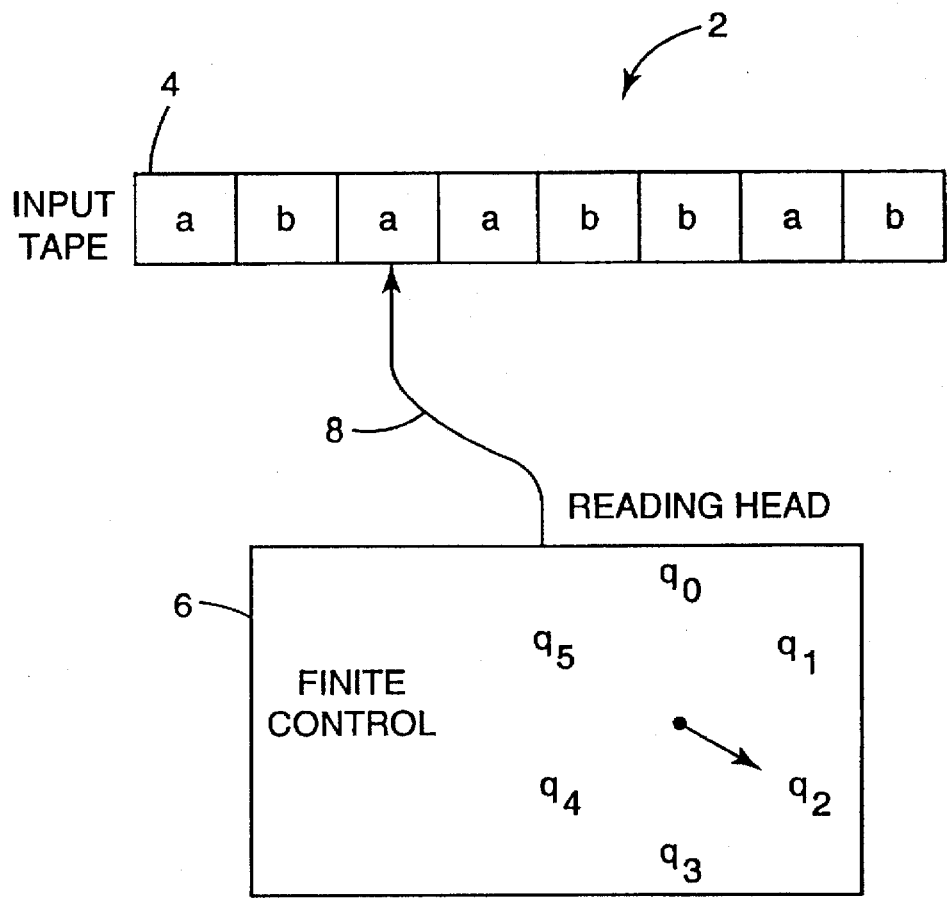
FIG. 1 is a schematic diagram of a finite automaton-like device.
Figure 2:
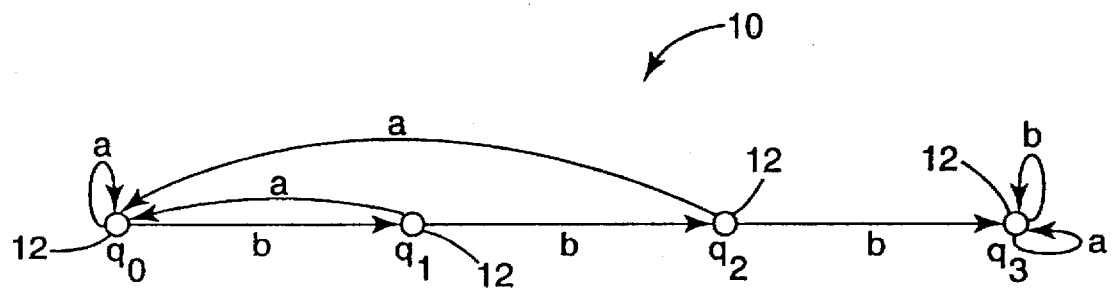
FIG. 2 is a state diagram of a transition function of a finite automaton device.
Figure 3:
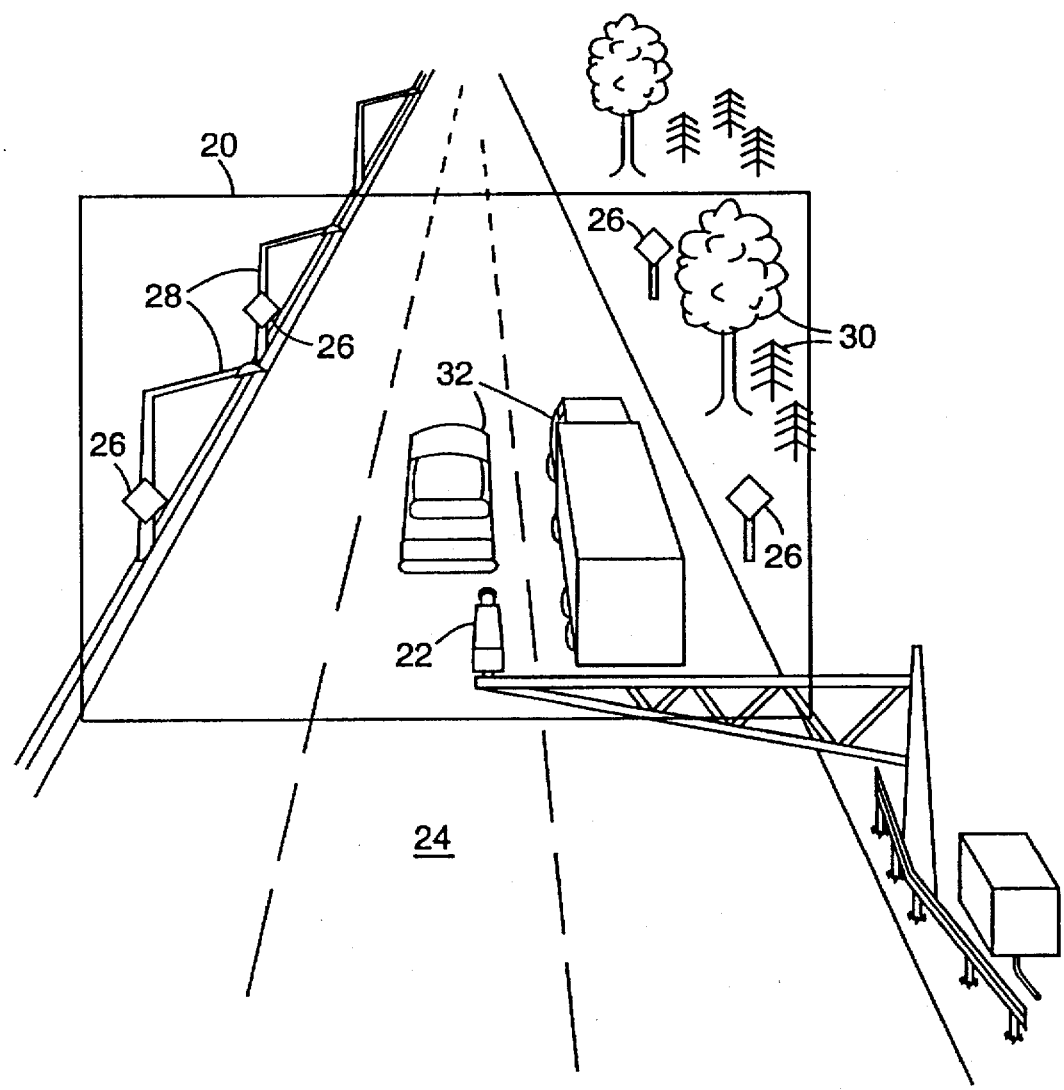
FIG. 3 is a perspective view of a typical roadway scene including a mounted video camera of the present invention.

Referring to FIG. 3, images of roadway scene 20 are acquired by video camera 22. Scene 20 include background objects such as roadway 24, road signs 26, light poles 28 and trees 30, as well as foreground objects, such as vehicles 32. For the present invention, a background portion of an image is a surface reflecting light within an image that is relatively further away from a viewing point, such as video camera 22, than any other surface that is reflecting light. The background portion need not always be the furthest point from the viewing point, but only relatively further than other objects that have passed between the background portion and the viewing point. Video camera 22 is part of a machine vision system, where video camera 22 provides the images of a scene that the machine vision system analyzes and interprets. Video camera 22 acquires the image and the image is digitized, either at video camera 22 or at a remote location by the machine vision system. Once digitized, the image array may be a 512×512 pixel three color image having an integer number defining intensity with a definition range for each color of 0–255.

Figure 4:
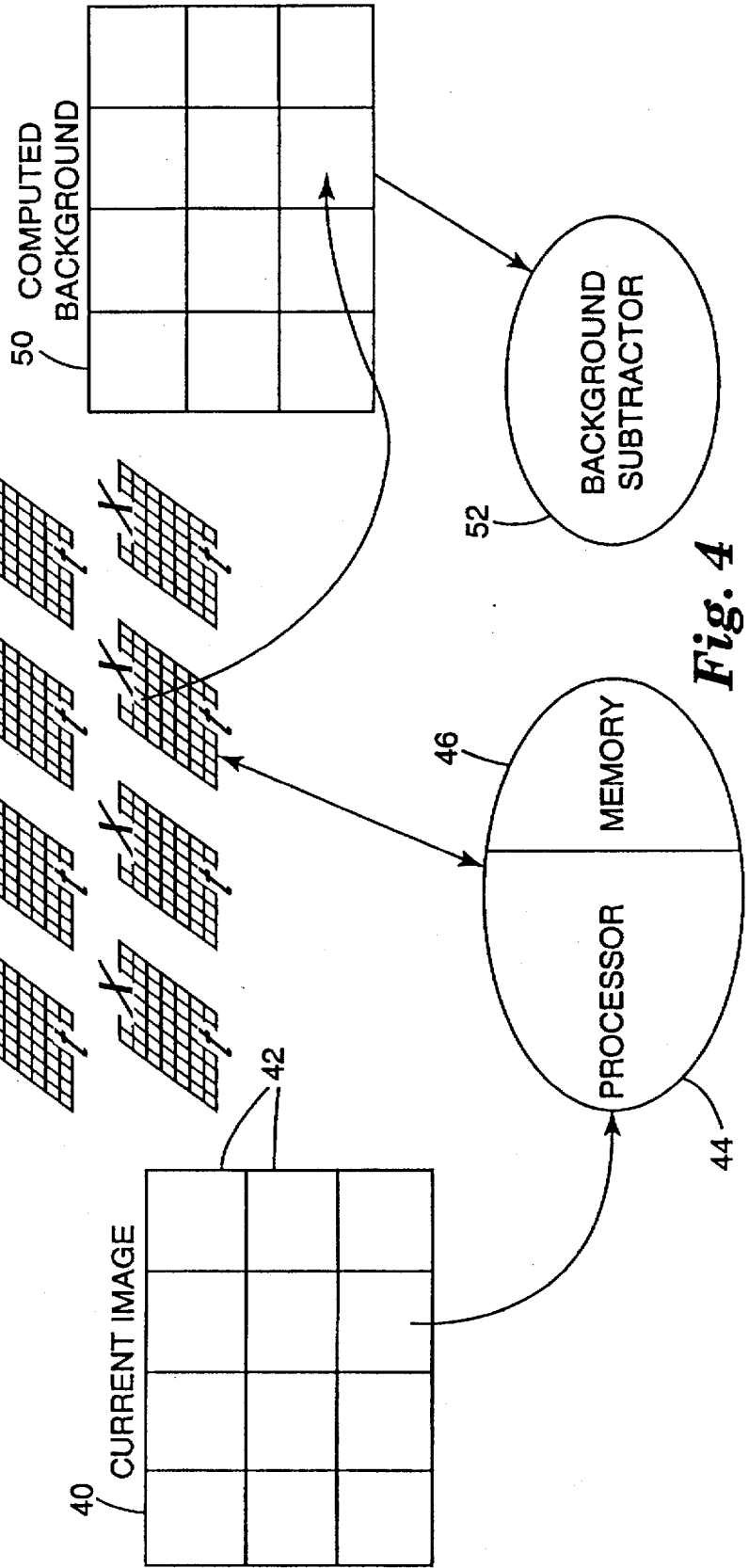
FIG. 4 is a schematic diagram representing the background determination process.

Once a digitized image had been acquired, the image is divided into a plurality of subimages. Referring to FIG. 4, image 40 is divided into twelve subimages, each subimage corresponding to a subimage location. In one embodiment, the entire image can be used as a subimage. In a preferred embodiment, however, the subimages are 8×8 pixel square images, such that in a 512×512 pixel image, a 64×64 subimage image will be created. In another preferred embodiment, each pixel within an image is designated as a subimage. The background determination process is modeled after the finite automaton computation theory. Each subimage 42, from image 40 is processed by processor 44, a finite automaton-like device. Processor 44 differs from a usual finite automaton device in that it does not accept a character string as an input. Instead, processor 44 transitions from one state to another based on properties of the current subimage input from image 40.

Processor 44 maintains state table 48 for the entire image 40. State table 48 has one state, X, for each subimage location. Processor 44 also contains memory 46 for storing reference subimages and time variables for each subimage location. Each subimage 42 from a current image is processed by processor 44. Processor 44 analyzes each subimage with respect to prior subimages in the same subimage location, as represented by the state of the subimage location in state table 48. If processor 44 determines that an object has passed over a subimage, in other words, if the object has passed between the subimage and the camera, then the processor determines that the subimage is a background subimage. If processor 44 determines that a particular subimage from the current image is a background subimage, the subimage is placed in its corresponding subimage location in a background image 50. Background image 50 is stored in background subtractor 52. Once background image 50 is determined, it may be used by background subtractor 52 to subtract background from image data.

Figure 5:
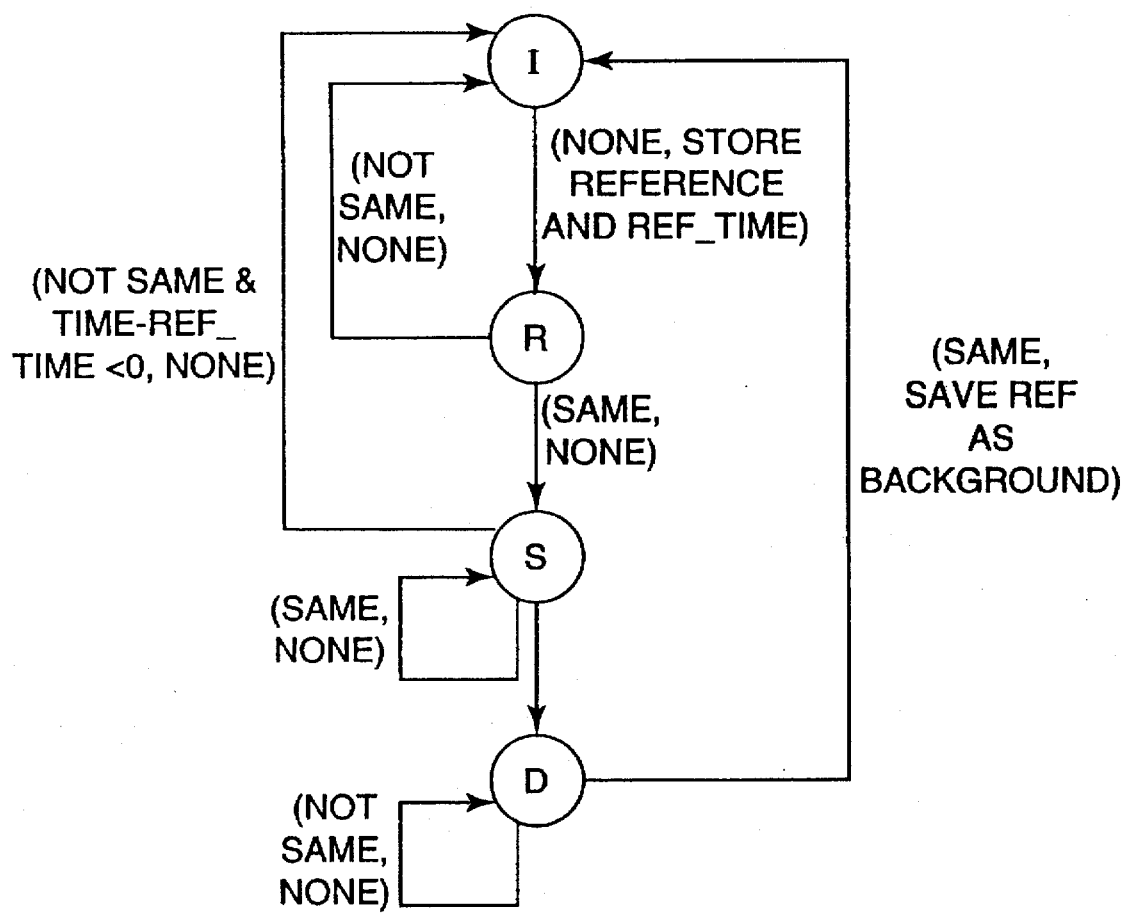
FIG. 5 is a state diagram of the transition function of the present invention.

Referring to FIG. 5, a state diagram is shown that represents the states and the transition functions for each subimage location. Each subimage location may in state table 48 may have any of four states: Initial state 60, I, got reference state 62, R, seen same as reference state 64, S, and seen different from reference state 66, D. State table 48 is initialized with all elements in I state 60. When in I state 60, processor 44 unconditionally stores the current subimage in memory 46 in a reference buffer for the location of the subimage, records the time that the current subimage was stored as a reference time and changes the state for the subimage location to R state 62. The subimage stored is the reference subimage.

In a preferred embodiment, when in R state 62, if processor 44 determines that the current subimage is similar to the reference subimage stored in memory 46, then the state for the location of the subimage is changed to S state 64, indicating that the current subimage is the same as the reference subimage. Similarity of the current subimage and the reference subimage for the corresponding subimage location is measured according to the average difference, over all pixels in the two subimages. A first threshold difference level, taking into account noise conditions, is used to determine if the condition of similarity is satisfied. While in R state 62, if the similarity condition is not satisfied by the current subimage, the state is changed back to I state 60. This indicates that the reference subimage is not a background subimage. While the preferred embodiment requires a similar subimage for two consecutive frames, the number of consecutive frames required to move from R state 62 to S state 64 can range from zero to any large number. When the number of similar consecutive frames is zero, R state 62 essentially drops out and S state 64 also performs the R state duties of storing the current subimage in memory 46 and recording the time that the current subimage was stored as a reference time. The requirement that the subimage is similar for two or more consecutive frames recognizes a characteristic of background, namely that it typically does not change or move over some minimal time.

When in S state 64, if processor 44 determines that the current subimage is similar to the reference subimage stored in memory 46, then the state for the location of the subimage stays in S state 64. If, however, processor 44 determines that the current subimage is significantly different than the reference image stored, as determined by a second threshold level, that may be the same as the first threshold level, then processor 44 refers to the reference time for the subimage location stored in memory. If some minimum time interval has not elapsed since the reference time, such as one second, the state for the location of the subimage is set back to I state 60, indicating that the subimage probably is not background because it is changing. One characteristic of background is that, during such short time intervals, it does not move. The state table may also, or alternatively, take advantage of this characteristic during R state 62. In particular, when R state 62 requires similar subimages for two or more consecutive frames before moving from R state 62 to S state 64, it indicates that the subimage location could be background because the subimage is not changing. On the other hand, when in S state 64, if the minimum time interval has elapsed, the state for the location of the subimage is set to D state 66, indicating that the current subimage is different than the reference subimage.

When in D state 66, if the current subimage is substantially different than the reference subimage, the state of the location of the subimage stays in D state 66. When the current subimage is the same as the reference subimage, however, the state of the location of the subimage is changed back to I state 60. Also, the reference subimage stored in memory 46 is placed in its corresponding location in the background image. This process may be continued serially, for each subimage within subsequent images, such that the background image is continually updated. Because when in D state 66 a large number of subimages could be different that the reference subimage, the state for a subimage location could continually cycle at D state 66. Therefore, a reset time may be included to set a state back to I state 60 after a long period of time, such as one minute.

Figure 6:
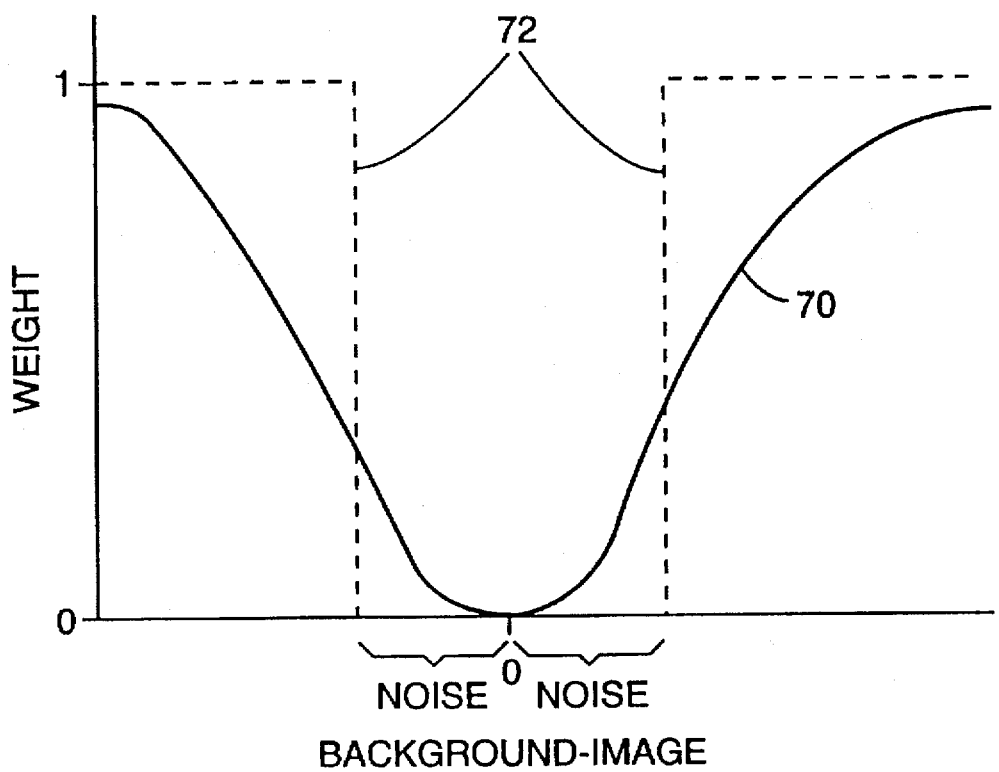
FIG. 6 shows an upside-down Gaussian curve used as the weighting curve in the present invention.

After a background image has been determined, it may be used to subtract background from image data. After background image data is subtracted from image data, a set of foreground pixel weights are computed. Referring to FIG. 6, a weighting curve for weighting pixels for a weight image is shown. The weighting curve assigns a value for each pixel in the weight image. First, each pixel in the current image and the same pixel in the background image are compared. They are assigned a weight between zero and one, depending on the difference in intensity of the pixel from the background image and the pixel from the current image. To the extent that the two pixels are the "same", in other words, the pixel from the image data has substantially the same intensity as the pixel from the background image data, then the weighting curve will give the corresponding pixel in the weight image a low weight. To the extent that the two pixel are "different", in other words, the pixel from the image data has substantially different intensity from the pixel from the background image data, then the weighting curve will give the corresponding pixel in the weight image a high weight, thereby indicating a tendency toward being a pixel in the foreground.

Figure 6A:
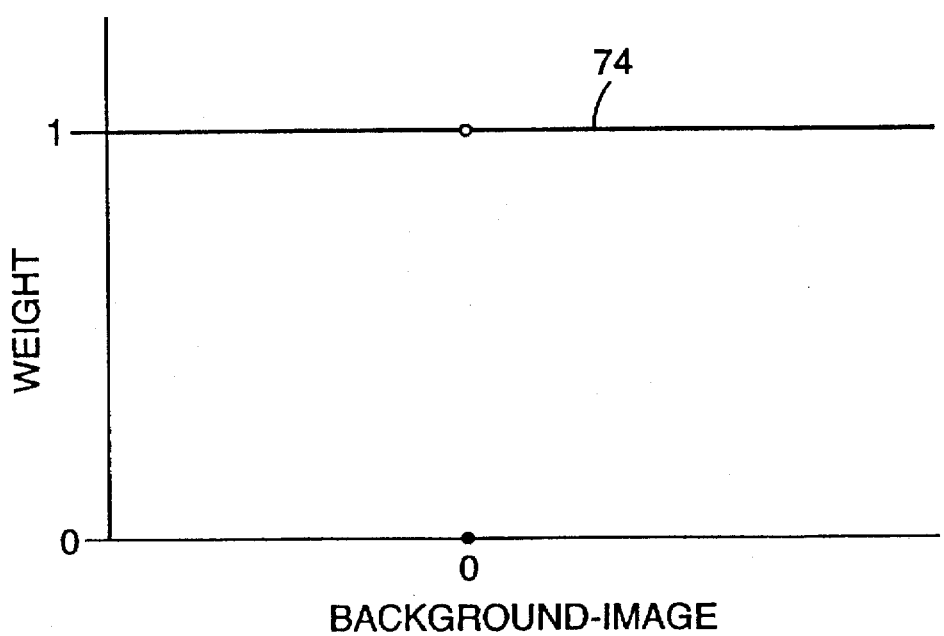
FIG. 6A shows a theoretical weighting curve.

In a theoretical case, without any noise considerations, a pixel from image data could conclusively be determined to be in the background image. If it was determined that a pixel from the image data was in the background image, the pixel would be given a foreground weight of zero, as shown in FIG. 6A. If it was determined that the pixel was not in the background image, it would be given a foreground weight of one. Only when the intensity of the background pixel and the image pixel were the same would theoretical weighting function 74 assign a weight of zero. Thus, in this theoretical case, each pixel would assigned a weight definitively reflecting that the pixel was, or was not, in the background image.

Real world applications, on the other hand, must allow for some degree of noise. For example, if a pixel from the image data was in the background, it should have the same intensity as the corresponding pixel from the background image. But, if noise existed within the image data, the pixel from the image data, even though in the background, could have a different intensity than the corresponding pixel from the background image. In this case, the noise would cause the theoretical weighting function 74 to erroneously assign a weight of one because the intensities of the two pixels were not the same. To compensate for noise, square wave curve 72, as shown in FIG. 6, could be used to weight the pixels in the weight image. Square wave 72 has a sigma parameter, $\sigma_{noise}$, on each side of zero on the x-axis, to take into account noise. Square wave 72 allows for some degree of noise by looking at the difference between the background image pixel intensity and the corresponding pixel from the image data, and even if the intensities are different by a small amount, square wave 72 will regard them as the same and assign them a weight of zero. Conversely, if the intensities are different by a reasonably large amount, namely an amount larger than $\sigma_{noise}$, then square wave 72 regards them as completely different and assign them a weight of one. The value of $\sigma_{noise}$ is determined by the noise properties of the system. For example, when noise is severe, the value of $\sigma_{noise}$ is larger to sufficiently compensate for the noise. Thus, rather than only having one point where a pixel from the image is regarded as in the background, as is the case in theoretical weighting curve 74, a range of values are regarded as in the background in the case of square wave 72.

In a preferred embodiment, upside-down Gaussian curve 70 is used as the weighting curve. The difference between the intensity of each pixel from the background image and the intensity of the corresponding pixel from the image data is determined. Then, upside-down Gaussian curve 70 assigns a weight to the corresponding pixel in a weight image according to the difference. To the extent that the difference is high, a value closer to one is assigned and to the extent that the difference is low, a value closer to zero is assigned. Upside-down Gaussian curve 70 does not only assign values of one or zero, but rather has a threshold that is a smooth curve. Thus, the foreground weight image corresponds to the difference in intensity between the background image and the image data, and is a measure of dissimilarity between the two.

The resulting foreground weights in the foreground weight image can then be applied to the image data by means of multiplication. The multiplication cannot be performed directly on the raw image. If the raw image is used, pixels that are given low weights may be confused with pixels that are dark. A more appropriate target for weighting is the edge intensity image, that is, the image containing data representing how likely a pixel is on an edge. This image is usually computed as an intermediate step in most machine vision applications. In such machine vision applications, the weighting of a pixel depends not only on the weighting from the aforementioned background determination method, but also may depend on numerous variables, including the magnitude of intensity of an edge element, the angle of the edge element and its location.

Figure 7:
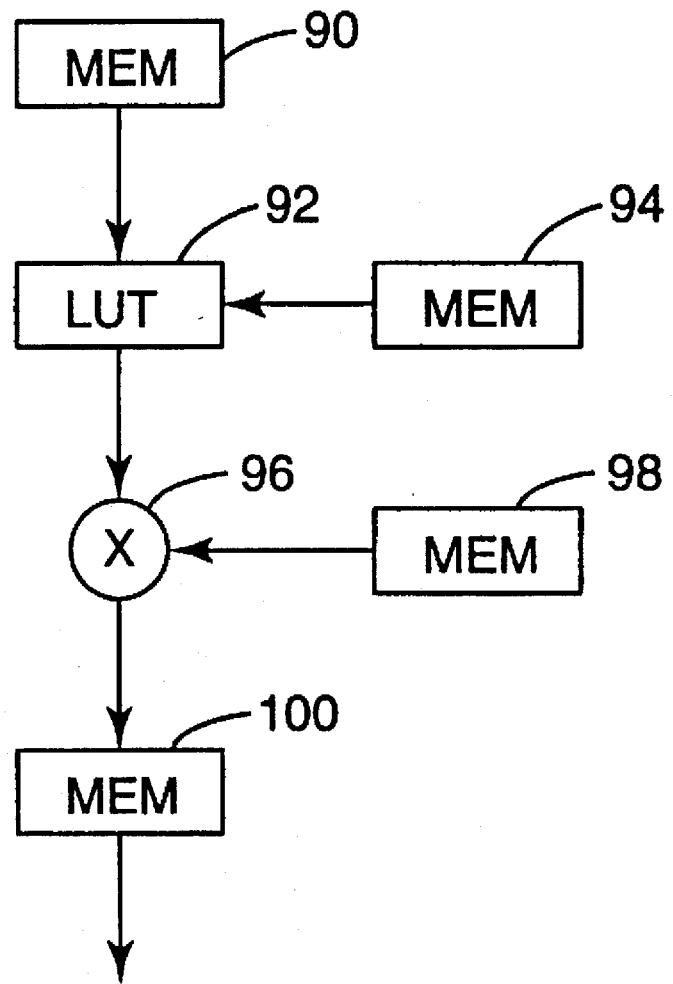
FIG. 7 is a block diagram of a hardware implementation of the background subtraction portion of the present invention.

Referring to FIG. 7, a hardware implementation of background subtraction from an image will now be described. Memory 90 stored an angle image of a background image.

The background image may be determined using the aforementioned background determination method. The background is sent to lookup table (LUT) 92 which generates foreground weights. LUT 92 receives an input angle image from memory 94. In a preferred embodiment, the input image will represent the likelihood that a pixel is on an edge. In a preferred embodiment, the pixel values in the angle images range from 0–180. LUT 92 takes the pixel values from the background image and the corresponding pixel values from the input image and output the corresponding foreground weight. The foreground weight values are based on a weighting curve, such as an upside-down Gaussian curve. In another embodiment, the background image is first subtracted from the input image at an adder module. The resulting difference image is then sent to a lookup table module whose lookup table stores information based on the weighting curve. LUT 92 then outputs the resulting foreground weights, which are a measure of probability that a pixel is in the foreground. Multiplier 96 multiplies the foreground weights with an intensity edge image stored in memory 98, which is a measure of the edge contrast of the input image, to produce the input image with background pixels removed. In some hardware implementations, it is further necessary to employ a shift module after the multiplication module to shift multiplier 96 output to produce an output with significant digits equal to the number of significant digits that were input. The resulting image is stored in memory 100. For each pixel, the higher the foreground weight, the more likely the pixel is foreground and the higher the contrast at that pixel. Conversely, the lower the foreground weight, the more likely the pixel is in the background and the multiplication diminishes or removes the pixel from the resulting image.

Although a preferred embodiment has been illustrated and described for the present invention, it will be appreciated by those of ordinary skill in the art that any method or apparatus which is calculated to achieve this same purpose may be substituted for the specific configurations and steps shown. For example, rather than using an upside-down Gaussian curve, a linear wedge function could be used as a weighting curve. This application is intended to cover any adaptations or variations of the present invention. Therefore, it is manifestly intended that this invention be limited only by the appended claims and the equivalents thereof.

What is claimed is:

1. A method of producing a background image from a plurality of images of a scene, said plurality of images acquired from a machine vision system with image acquisition means, said method comprising the steps of:

a) selecting within each image of said plurality of images a subimage;

b) acquiring a reference subimage corresponding to said subimage;

c) designating said reference subimage as a background subimage if any object has passed between said reference subimage and said image acquisition means in subsequent images; and d) storing said background subimage in a corresponding position in said background image;

wherein said steps of acquiring reference subimages and designating said reference subimage as a background subimage comprise the steps of:

e) initializing a state table for said image, said state table having a first state for each subimage location corresponding to each said subimage after said step of initializing;

f) storing a first subimage from a first subimage location in a reference buffer and assigning a second state to said first subimage location;

g) comparing subsequent subimages in said first subimage location with said first subimage;

h) assigning a third state to said first subimage location when a predetermined number of subsequent subimages are similar to said subimage stored in said reference buffer when said first subimage location is assigned said second state;

i) assigning a fourth state to said first subimage location when said subsequent subimage is significantly different than said subimage stored in said reference buffer and said first subimage location is assigned said third state;

j) designating said subimage stored in said reference buffer as said background subimage when said subsequent subimage is substantially similar to said subimage stored in said reference buffer and said first subimage location is assigned said fourth state; and k) repeating steps f) through j) for each subimage location and said subsequent subimages corresponding to said subimage location.

2. The method of producing a background image from a plurality of images of a scene according to claim 1, wherein a plurality of subimages are selected within each image.

3. The method of producing a background image from a plurality of images of a scene according to claim 1, further comprising the step of assigning said first state to said first subimage location if said first subimage location is assigned said fourth state for a predetermined time.

4. The method of producing a background image from a plurality of images of a scene according to claim 1, wherein each said subimage comprises a single pixel within said image.

5. The method of producing a background image from a plurality of images of a scene according to claim 1, wherein said predetermined number of subsequent subimages is zero.

6. A machine vision system for producing a background image from a plurality of images of a scene, said system comprising:

a) image acquisition means for acquiring images from three-dimensional space;

b) dividing means for dividing said images into subimages;

c) memory means for storing said images, said subimages, reference subimages and said background image; and d) processor means for determining when any object passes between said reference subimages and said image acquisition means in subimages acquired subsequent to acquiring said reference subimage;

wherein said processor means determines whether an object passes between said reference subimages and said image acquisition means by the steps of:

e) initializing a state table for said image, said state table having a first state for each subimage location corresponding to each said subimage after said step of initializing;

f) storing a first subimage from a first subimage location in a reference buffer and assigning a second state to said first subimage location;

g) comparing subsequent subimages in said first subimage location with said first subimage;

h) assigning a third state to said first subimage location when a predetermined number of subsequent subimages are similar to said subimage stored in said reference buffer when said first subimage location is assigned said second state;

i) assigning a fourth state to said first subimage location when said subsequent subimage is significantly different than said subimage stored in said reference buffer and said first subimage location is assigned said third state;

j) designating said subimage stored in said reference buffer as said background subimage when said subsequent subimage is substantially similar to said subimage stored in said reference buffer when said first subimage location is assigned said fourth state; and k) repeating steps f)–j) for each subimage location and said subsequent subimages corresponding to said subimage location.

7. The machine vision system for producing a background image from a plurality of images of a scene according to claim 6, further comprising a second processing means for comparing said background image with input images and subtracting background from said input images.

8. The machine vision system for producing a background image from a plurality of images of a scene according to claim 6, wherein said image acquisition means comprises a monocular vision device.

9. The machine vision system for producing a background image from a plurality of images of a scene according to claim 7, wherein said second processing means comprises:

a) means for generating foreground weights based on the difference between said background image and said input images as weighted by a weighting curve; and b) multiplier means for multiplying said foreground weights with a measure of edge contrast of said input image.

10. The machine vision system for producing a background image from a plurality of images of a scene according to claim 9, wherein said means for generating foreground weights comprises a lookup table.

* * * * *